No. 784,621. Patented March 14, 1905.

UNITED STATES PATENT OFFICE.

PAUL KLEIN, OF RIGA, RUSSIA.

PROCESS OF MANUFACTURING REFRACTORY ARTICLES.

SPECIFICATION forming part of Letters Patent No. 784,621, dated March 14, 1905.

Application filed March 19, 1904. Serial No. 199,033.

*To all whom it may concern:*

Be it known that I, PAUL KLEIN, a subject of the Emperor of Russia, residing at 577 Plettenbergstrasse, Riga, in the Empire of Russia, have invented a new and useful Process for Manufacturing Refractory Articles, of which the following is a specification.

Highly-refractory articles as heretofore made, especially bricks of fire-clay, contain at most forty-two per cent. of alumina, this being approximately the maximum percentage of alumina contained in silicates of alumina occurring in nature. By adding hydrate of alumina I succeed in manufacturing articles containing up to ninety-five per cent. of alumina and possessing highly-refractory properties. Thus I obtain alumina bricks or slabs in which the alumina is bound or cemented by small quantities of native silicate of alumina, and, furthermore, by the silicate of alumina produced in consequence of the addition of quartz during the burning.

The articles manufactured by this process are capable of resisting acids and bases also at high temperatures, slags do not adhere to them, and neither shrinkage nor distention takes place.

My said invention comprises a process for manufacturing highly-refractory articles from commercially-pure hydrate of alumina, $Al_2(OH)_6$, with addition of quartz. For this purpose hydrate of alumina is intimately mixed with pulverized quartz, molded and pressed, and then burned. The quantity of the latter material to be added depends on the degree of refractoriness which the manufactured article is to possess. I obtain excellent results by mixing, for example, one hundred parts, by weight, of hydrate of alumina with twelve parts, by weight, of quartz.

Bricks, crucibles, muffle-furnaces, retorts, and the like of the highest refractoriness may be produced by this process in an exceedingly cheap manner.

What I claim as my invention, and desire to secure by Letters Patent, is—

1. A process for manufacturing refractory articles, consisting in mixing pure hydrate of alumina, $Al_2(OH)_6$, with from ten to eighty per cent. of pulverized quartz, molding and pressing and then burning such mixture, substantially as herein described.

2. As a new product, a refractory article made of pure hydrate of alumina and quartz, and consisting of silicate of alumina containing upward of forty-two per cent. of alumina, substantially as herein described.

In testimony whereof I have signed my name to this specification in the presence of the subscribing witnesses.

PAUL KLEIN.

Witnesses:
 CHR. SCHULIN,
 SÖREN HANSEN,
 ARTHUR PULEY.